United States Patent
Hamasaki et al.

(10) Patent No.: US 10,025,281 B2
(45) Date of Patent: Jul. 17, 2018

(54) CONTROL DEVICE AND SYSTEM PROGRAM, AND RECORDING MEDIUM

(75) Inventors: Osamu Hamasaki, Kyoto (JP); Shigeyuki Eguchi, Kyoto (JP); Akiro Kobayashi, Shiga (JP); Yukio Iname, Kyoto (JP); Koji Yaoita, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 1021 days.

(21) Appl. No.: 14/005,345

(22) PCT Filed: Sep. 26, 2011

(86) PCT No.: PCT/JP2011/071861
§ 371 (c)(1),
(2), (4) Date: Nov. 25, 2013

(87) PCT Pub. No.: WO2012/124198
PCT Pub. Date: Sep. 20, 2012

(65) Prior Publication Data
US 2014/0088735 A1    Mar. 27, 2014

(30) Foreign Application Priority Data
Mar. 15, 2011   (JP) .................................. 2011-056871

(51) Int. Cl.
*G05B 19/04*  (2006.01)
*G05B 19/042* (2006.01)

(52) U.S. Cl.
CPC ........... *G05B 19/04* (2013.01); *G05B 19/042* (2013.01); *G05B 2219/25347* (2013.01)

(58) Field of Classification Search
CPC .................................................... G05B 19/04
(Continued)

(56) References Cited

U.S. PATENT DOCUMENTS

| 5,371,887 A * | 12/1994 | Yoshida | ............... G06F 9/3851 |
| | | | 711/202 |
| 7,035,898 B1 * | 4/2006 | Baker | .................... G05B 19/05 |
| | | | 700/83 |

(Continued)

FOREIGN PATENT DOCUMENTS

| JP | 2000-181515 | 6/2000 |
| JP | 2005-293312 | 10/2005 |

(Continued)

OTHER PUBLICATIONS

International Search report for PCT/JP2011/071861, dated Oct. 25, 2011.

(Continued)

*Primary Examiner* — Sean Shechtman
(74) *Attorney, Agent, or Firm* — Greenblum & Bernstein, P.L.C.

(57) ABSTRACT

A control device capable of appropriately switching operating modes when multitasking is being performed is provided. A CPU unit is provided with a task executing unit for executing a plurality of tasks in parallel, and for executing each task in cycles based on each task; and a mode switching unit for switching operating modes. The task executing unit is configured in such a manner that when in operation mode, a user program is executed for each task, and when in program mode, a user program is not executed for each task. The mode switching unit is configured in such a manner that the operating mode is switched when a plurality of tasks being executed by the task executing unit are synchronized

4 Claims, 8 Drawing Sheets

(58) Field of Classification Search
USPC .......................................................... 700/275
See application file for complete search history.

(56) References Cited

U.S. PATENT DOCUMENTS

| | | |
|---|---|---|
| 2007/0255875 A1 | 11/2007 | Weiberle et al. |
| 2007/0294559 A1 | 12/2007 | Kottke |
| 2008/0091927 A1 | 4/2008 | Mueller et al. |
| 2008/0126718 A1 | 5/2008 | Kottke et al. |
| 2008/0163035 A1 | 7/2008 | Kottke |
| 2008/0209170 A1 | 8/2008 | Mueller et al. |
| 2008/0209251 A1 | 8/2008 | Kottke |
| 2008/0263340 A1 | 10/2008 | Weiberle et al. |
| 2008/0270660 A1 | 10/2008 | Weiberle et al. |
| 2008/0270746 A1 | 10/2008 | Mueller et al. |
| 2008/0270747 A1 | 10/2008 | Pfeiffer et al. |
| 2008/0288758 A1 | 11/2008 | Mueller et al. |
| 2008/0313384 A1 | 12/2008 | Angerbauer et al. |
| 2008/0320287 A1 | 12/2008 | von Collani et al. |
| 2008/0320340 A1 | 12/2008 | Weiberle et al. |
| 2009/0044048 A1 | 2/2009 | Weiberle et al. |
| 2009/0055674 A1 | 2/2009 | Mueller et al. |
| 2009/0119540 A1 | 5/2009 | Weiberle et al. |
| 2009/0125749 A1 | 5/2009 | Weiberle et al. |
| 2009/0164826 A1 | 6/2009 | Kottke |
| 2009/0204740 A1 | 8/2009 | Weiberle et al. |
| 2009/0265581 A1 | 10/2009 | von Collani et al. |
| 2010/0049891 A1* | 2/2010 | Hartwich ............ H04J 3/0655 710/110 |
| 2012/0240132 A1 | 9/2012 | Kobayashi et al. |

FOREIGN PATENT DOCUMENTS

| | | |
|---|---|---|
| JP | 2008-282363 | 11/2008 |
| JP | 2009-181443 | 8/2009 |
| JP | 4532561 | 8/2010 |

OTHER PUBLICATIONS

U.S. Appl. No. 14/027,578 to Masanori Ota et al., filed Sep. 16, 2013.

U.S. Appl. No. 14/003,342 to Koji Yaoita et al., filed Sep. 5, 2013.

* cited by examiner

| Name | Degree of preference | Cycle | User program | Program organization unit of user program | |
|---|---|---|---|---|---|
| | | | | Program | Function-Function block |
| Task A | 1 | 1ms | UPa | Pa1, Pa2 | FB1 |
| Task B | 2 | 2ms | UPb | Pb1, Pb2 | FB1 |
| Task C | 3 | 4ms | UPc | Pc1 | FB2, FB3 |

L1

| Name | Degree of preference | Cycle | User program | Program organization unit of user program | |
|---|---|---|---|---|---|
| | | | | Program | Function-Function block |
| Task D | 1 | 1ms | UPd | Pd1, Pd2 | FB4 |
| Task E | 2 | 2ms | UPe | Pe1, Pe2 | FB4 |

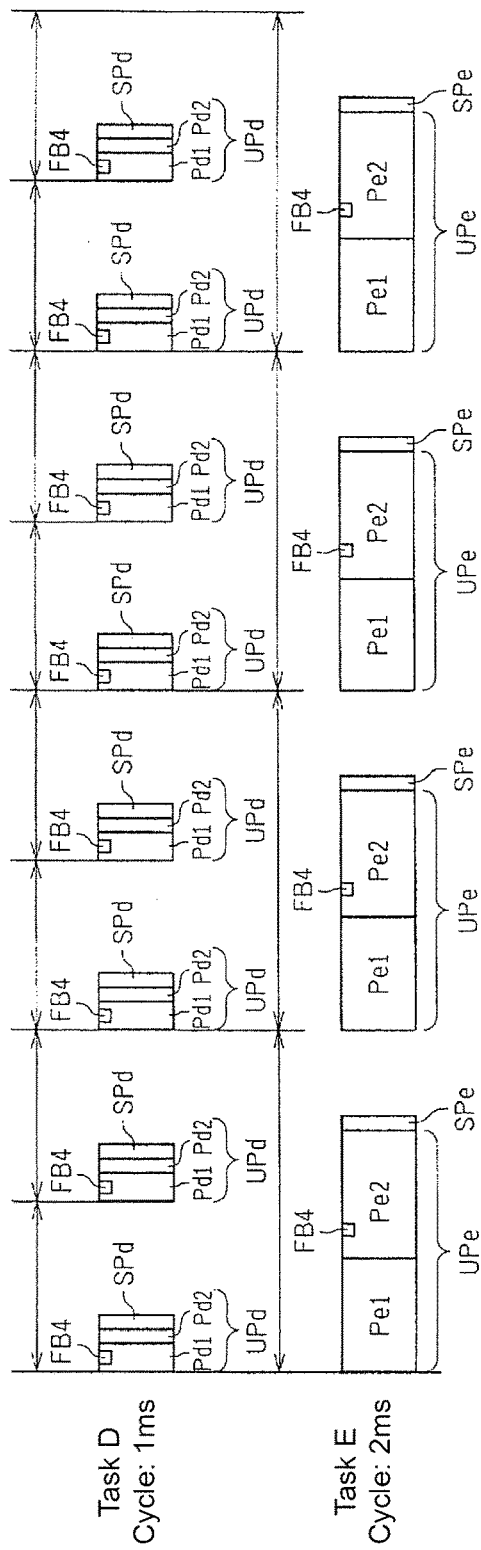

CONTROL DEVICE AND SYSTEM PROGRAM, AND RECORDING MEDIUM

TECHNICAL FIELD

The present invention relates to a control device for controlling a control object apparatus, a system program executed by the control device and a recording medium in which the system program is recorded.

BACKGROUND ART

Conventionally, a PLC (Programmable Logic Controller) for controlling an industrial machine or the like installed in a production line of a factory has been known.

The PLC is provided with a CPU unit for controlling the PLC, an input unit to which a signal from a sensor is inputted, and an output unit for outputting a control signal to an industrial machine or the like. The CPU unit has a memory for storing a user program for controlling the industrial machine or the like. This user program is configured so as to be editable by a tool device connected to the CPU unit.

Moreover, in the PLC, a process for acquiring a signal inputted to the input unit in the memory of the CPU unit, a process for executing the user program, a process for writing execution results (operation results) of the user program in the memory and for sending them to the output unit, and a peripheral process for transmitting and receiving data to and from the tool device are executed repeatedly. Thus, the PLC can control an industrial machine or the like based upon an input from the sensor.

Moreover, conventionally, a PAC (Programmable Automation Controller) provided with a high degree software function of a personal computer and reliability of the PLC has been known (for example, see Patent Document 1 (Japanese Unexamined Patent Publication No. 2009-181443)).

The PAC of the above-mentioned Patent Document 1 (Japanese Unexamined Patent Publication No. 2009-181443) is configured to execute a plurality of tasks in parallel with one another in a time sharing manner, with each task being executed in cycles based on each task. That is, this PAC carries out multitask processes.

In this PAC, it is proposed that an operation mode for executing a user program in each task and a program mode for executing no user program in each task are prepared in a switchable manner.

In this case, the operation mode is a mode for actually controlling an industrial machine or the like by executing a user program, and the program mode is a mode which allows the user to edit a user program by using a tool device, without executing a user program. For this reason, the execution of a user program is stopped by switching modes from the operation mode to the program mode, while the execution of the user program is started by switching modes from the program mode to the operation mode.

PRIOR ART DOCUMENT

Patent Document

Patent Document 1: Japanese Unexamined Patent Publication No. 2009-181443

SUMMARY OF THE INVENTION

Problems to be Solved by the Invention

In the above-mentioned PAC, however, upon carrying out multitask processes, a problem arises in that it becomes difficult to appropriately carry out switching of modes because cycles of the respective tasks are different from one another. More specifically, even though an execution of a user program of a task having a short cycle is completed in switching modes from an operation mode to a program mode, when the switching of mode is carried out during an execution of a user program of a task having a long cycle, a problem arises in that a normal operation result is not obtained in the user program having a long cycle, with the result that the PAC fails to accurately control an industrial machine or the like.

The present invention has been devised to solve the above-mentioned problem, and the object of the present invention is to provide a control device that can appropriately switch operating modes even when multitask processes are being carried out and a system program executed in the control device, as well as a recording medium in which the system program is recorded.

Means for Solving the Problem

A control device according to one aspect of the present invention is a control device for controlling a control object apparatus including: a task executing unit configured to execute a plurality of tasks in parallel with one another, and to execute each task in a cycle corresponding to the task; and a mode switching unit configured to switch operating modes of the task executing unit. The task executing unit is configured such that in a first mode, a user program is executed for each task, and in a second mode, a user program is not executed for each task. The mode switching unit is configured such that the operating mode of the task executing unit is switched when the plurality of tasks, which are being executed by the task executing unit, are synchronized with one another.

Additionally, to execute a plurality of tasks in parallel with one another includes a case in which a plurality of tasks are executed simultaneously in parallel with one another and a case in which a plurality of tasks are executed in parallel with one another in a time sharing manner. Moreover, the time at which tasks are synchronized with one another refers to a point of time after executions of a plurality of tasks carried out in cycles based on each task and prior to the simultaneous starts of the execution cycles of the plurality of tasks. Furthermore, the user program is a program for controlling a control object apparatus, and a first mode is an operating mode in which the control on the control object apparatus is carried out, and a second mode is an operating mode in which no control on the control object apparatus is carried out.

With this configuration, in the case that a plurality of tasks, which are being executed, are synchronized with one another, switching operating modes in the task executing unit can prevent the execution of a user program for each task from being interrupted even if the cycles of the respective tasks are different from one another. Therefore, it is possible to appropriately switch operating modes when multitask processes are carried out. As a result, since a correct operation result can be obtained in the user program for each task, the control device is allowed to normally control the control object apparatus.

The control device may include a management unit configured to manage executions of a plurality of tasks by the task executing unit, and to manage timing in which the mode switching unit switches the operating mode in the task executing unit.

With this configuration, operating modes in the task executing unit can be easily switched by the management unit, when the plurality of tasks, which are being executed, are synchronized with one another.

The control device including the management unit includes a receiving unit configured to receive a switching instruction for operating modes in the task executing unit. The management unit may be configured such that when the plurality of tasks, which are being executed by the task executing unit, are synchronized with one another after the receipt of the switching instruction for operating modes by the receiving unit, the operating mode in the task executing unit is switched by the mode switching unit.

With this configuration, the operating modes in the task executing unit can be switched, when the plurality of tasks, which are being executed, are synchronized with one another after a receipt of a switching instruction.

In this case, the control device includes a storing unit configured to switch a user program, and a communication unit configured to communicate with a tool device for editing the user program stored in the storing unit. The receiving unit may be configured to receive the switching instruction transmitted from the tool device via the communication unit.

With this configuration, the user is allowed to switch operating modes in the task execution unit by using the tool device.

In the control device, the task executing unit may be configured so as to execute a plurality of tasks simultaneously in parallel with one another.

With this configuration, it is possible to improve the task processing capability.

In the control device, the task executing unit may be configured so as to execute a plurality of tasks in parallel with one another in a time sharing manner.

With this configuration, it is possible to carry out the task processing efficiently.

In the control device, a plurality of tasks may include a reference task and tasks other than the reference task, with each of the tasks other than the reference task being set to have a cycle having an integral multiple of the cycle of the reference task.

With this configuration, it is possible to easily make a plurality of tasks synchronized with one another.

A system program according to another aspect of the present invention is a system program, which is executed by a control device including a first mode in which a control object apparatus is controlled by executing a user program in each task and a second mode in which no user program is executed in each task, the system program including: a sequence for executing a plurality of tasks in parallel in a cycle based on each task; and a sequence for switching modes between the first mode and the second mode when the plural tasks, which are being executed, are synchronized with one another.

With this configuration, it is possible to appropriately switch operating modes while multitask processes are being carried out by the control device.

A recording media of another aspect of the present invention is a recording media that has recorded the system program, allowing a computer to read the system program.

Effect of the Invention

The present invention can provide a control device capable of appropriately switching operating modes when multitask processes are being performed, a system program to be executed in such a control device, and a recording medium in which the system program is recorded.

BRIEF DESCRIPTION OF THE DRAWINGS

FIG. 11 shows a time chart for explaining operations, at the time of an operation mode, of the CPU unit in accordance with the second embodiment of the present invention.

MODE FOR CARRYING OUT THE INVENTION

Hereinafter, referring to drawings, the following description will be given of an embodiment of the present invention.

<First Embodiment>

First, referring to FIGS. 1 to 4, the following description will be given of a configuration of a PAC 100 provided with a CPU unit 1 in accordance with a first embodiment.

Figure 1:
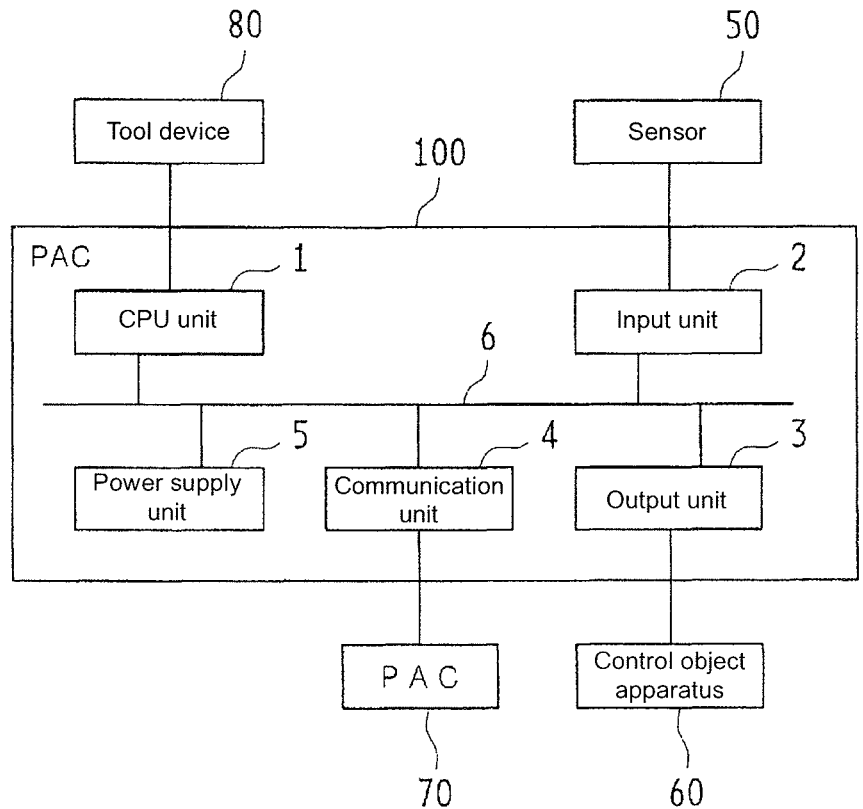
FIG. 1 is a hardware block diagram showing a configuration of a PAC provided with a CPU unit in accordance with a first embodiment of the present invention.

As shown in FIG. 1, the PAC 100 is provided with a CPU unit 1 for controlling the PAC 100, an input unit 2 to which a signal from a sensor 50 is inputted, an output unit 3 for outputting a control signal to a control object apparatus 60 such as an industrial machine, a communication unit 4 for communicating with another PAC 70, a power supply unit 5 for supplying a power to the respective units and an internal bus 6 for connecting the respective units to one another. Additionally, the CPU unit 1 is one example of "the control device" of the present invention.

The PAC 100 is configured to control the control object apparatus 60 based upon an input from the sensor 50 by executing a task. In this case, the task includes the execution of a user program for controlling the control object apparatus 60.

The CPU unit 1 in which a system program 121 (see FIG. 2) is installed is configured so that operations of the CPU unit 1 are controlled by executing the system program 121. In this case, the system program 121 includes a program for executing an acquiring process of a signal inputted to the input unit 2 into the CPU unit 1, a program for executing a sending process of operation results by the CPU unit 1 to the output unit 3, and the like.

Figure 2:
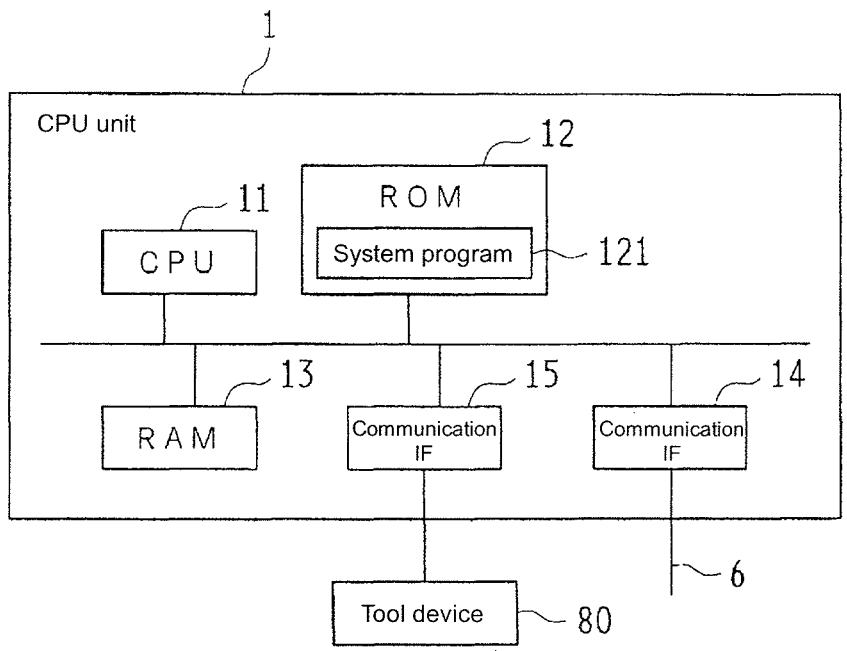
FIG. 2 is a hardware block diagram showing configurations of the CPU unit of the PAC shown in FIG. 1.

As shown in FIG. 2, the CPU unit 1 includes a CPU 11, a ROM 12, a RAM 13, and communication interfaces (hereinafter, referred to as "communication IF") 14 and 15. Additionally, the ROM 12 is one example of "the storing unit" of the present invention, and the communication IF 15 is one example of "the communication unit" of the present invention.

The CPU 11 has a function for executing the system program 121. The CPU 11 is a single core device and configured to execute a plurality of tasks in parallel with one another in a time sharing manner. That is, the CPU 11 executes multitask processes.

The ROM 12 is a nonvolatile memory such as a flash memory. In the ROM 12, the system program 121 is stored, and information L1 (see FIG. 4) relating to tasks to be executed in the CPU unit 1 is also stored. The information L1 relating to tasks includes names of the respective tasks, degrees of preference of the respective tasks, cycles in which the respective tasks are executed, configurations of the user programs to be executed in the respective tasks and a program organization unit (POU) for forming the user program for each of the tasks. Moreover, in the CPU unit 1, a control cycle having a predetermined time interval (for example, 1 ms) is adopted as a common cycle for the entire processes. In this case, with respect to the tasks, a task having a smaller value in the degree of preference is executed preferentially. Moreover, the user program is described in, for example, a ladder language.

In this case, each program organization unit is a minimum unit on program managements, and includes a program, a function, and a function block. Moreover, the function and the function block of the program organization unit can be re-used. That is, the function and the function block of the program organization unit can be commonly used in a plurality of user programs. Here, the function is a function for outputting a constant output value corresponding to the predetermined input value when a predetermined input value is inputted, and the function block is a function whose output value in response to the input value is not constant, because it is allowed to maintain an inner state.

Figures 3, 4:
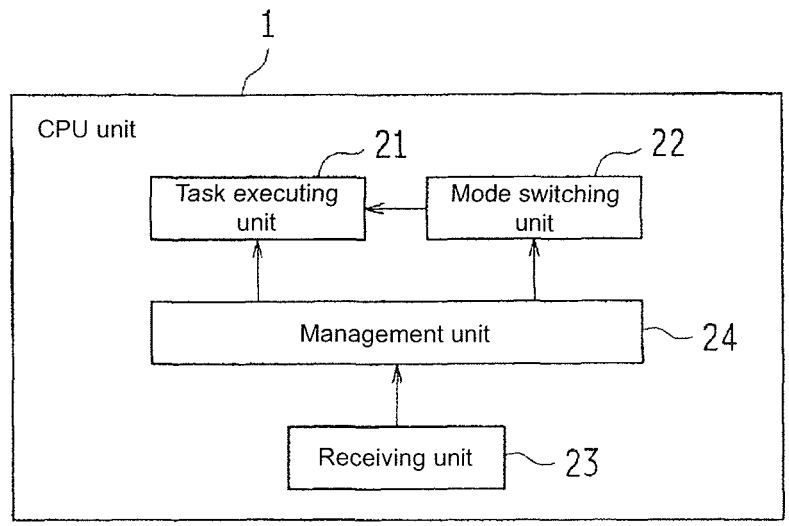
FIG. 3 is a functional block diagram of the CPU unit shown in FIG. 2.
FIG. 4 is a view for explaining information relating to tasks stored in a ROM of the CPU unit shown in FIG. 2.

In the example of FIG. 4, a task A is more preferentially executed than tasks B and C, and is executed in a cycle of 1 ms. That is, the task A uses a control cycle of one time (time interval of 1 ms) as its execution cycle. Moreover, the task A includes a user program UPa configured by programs Pa1 and Pa2. Moreover, the task A includes a function block FB1 to be utilized in the program Pa1. Additionally, the task A is one example of "the reference task" of the present invention.

The task B is more preferentially executed than the task C, and is executed in a cycle of 2 ms. That is, the task B uses a control cycle of two times (time interval of 2 ms) as its execution cycle. Moreover, the cycle of the task B is set to an integral multiple (2 times) of the cycle of the task A. Furthermore, the task B includes a user program UPb configured by programs Pb1 and Pb2. The task B includes a function block FB1 to be utilized in the program Pb2. Additionally, the task B is one example of "a task other than the reference task" of the present invention.

The task C is executed more subordinately than the tasks A and B, and is executed in a cycle of 4 ms. That is, the task C uses a control cycle of four times (time interval of 4 ms) as its execution cycle. Furthermore, the cycle of the task C is set to an integral multiple (4 times) of the cycle of the task A. The task C includes a user program UPc configured by a program Pc1. Further, the task C includes function blocks FB2 and FB3 to be utilized in the program Pc1. Additionally, the task C is one example of "a task other than the reference task" of the present invention.

The user programs UPa to UPc are stored in the ROM 12. For this reason, in the ROM 12, the programs Pa1, Pa2, Pb1, Pb2 and Pc1, each forming a program organization unit, and function blocks FB1 to FB3, each forming a program organization unit, are stored.

The RAM 13 is a volatile memory such as a DRAM. The RAM 13 has a function for temporarily storing a system program 121 or the like to be executed by the CPU 11. The communication IF 14 is connected to the internal bus 6, and is installed so as to allow the CPU unit 1 to communicate with the respective units via the internal bus 6. The communication IF 15 is connected to a tool device 80, and is installed so as to allow the CPU unit 1 to communicate with the tool device 80.

The tool device 80 is, for example, a personal computer, and has functions for forming and editing a user program to be executed in the PAC 100. Moreover, the tool device 80 has a function for downloading the user program from the PAC 100, and also has a function for uploading the user program to the PAC 100. Furthermore, the tool device 80 has a function for transmitting a switching instruction of operating modes of the CPU unit 1.

As shown in FIG. 3, the CPU unit 1 includes a task executing unit 21, a mode switching unit 22, a receiving unit 23 and a management unit 24. In this case, the task executing unit 21, the mode switching unit 22, the receiving unit 23 and the management unit 24 are realized when the CPU 11 (see FIG. 2) executes the system program 121. The task executing unit 21 is one example of "the task executing unit" of the present invention, and the mode switching unit 22 is one example of "the mode switching unit" of the present invention. Moreover, the receiving unit 23 is one example of "the receiving unit" of the present invention, and the management unit 24 is one example of "the management unit" of the present invention.

The task executing unit 21 is configured so as to execute a plurality of tasks in parallel with one another and also execute the respective tasks in cycles based on the respective tasks. More specifically, the task executing unit 21 executes the tasks A, B and C in parallel with one another in a time sharing manner. Moreover, the task executing unit 21 executes the task A in a cycle of 1 ms, executes the task B in a cycle of 2 ms, and also executes the task C in a cycle of 4 ms.

Moreover, the task executing unit 21 is configured so as to execute a user program in each task at the time of an operation mode, and so as not to execute a user program in each task at the time of a program mode. More specifically, at the time of the operation mode, the task executing unit 21 executes the user program UPa and a program SPa other than the user program in the task A, executes the user program UPb and a program SPb other than the user program in the task B, and executes the user program UPc and a program SPc other than the user program in the task C. Moreover, at the time of the program mode, the task executing unit 21 executes only the program SPa other than the user program in the task A, executes only the program SPb other than the user program in the task B, and executes only the program SPc other than the user program in the task C. Additionally, the programs SPa, SPb and SPc other than the user program are programs forming one portion of the system program 121.

In this case, the operation mode is a mode for actually controlling the control object apparatus 60 (see FIG. 1) such as an industrial machine by executing the user program, and the program mode is a mode for allowing the user to edit a user program by using the tool device 80 (see FIG. 2) without executing the user program. That is, the operation mode is a mode in which control on the control object apparatus 60 is carried out, while the program mode is a mode in which no control on the control object apparatus 60 is carried out. For this reason, when the mode is switched from the operation mode to the program mode, the execution of the user program is stopped, and when the mode is switched from the program mode to the operation mode, the execution of the user program is started. In this case, the operation mode is one example of "the first mode" of the present invention, and the program mode is one example of "the second mode" of the present invention.

The mode switching unit 22 is configured to switch operating modes when a plurality of tasks executed by the task executing unit 21 are synchronized with one another (when execution cycles of the plurality of tasks are coincident with one another). Additionally, the operating modes include the operation mode and the program mode. More specifically, when the task A to be executed in the cycle of 1 ms, the task B to be executed in the cycle of 2 ms and the task C to be executed in the cycle of 4 ms are synchronized with one another, the mode switching unit 22 switches the operating modes. In this case, the time at which the tasks are synchronized with one another refers to a point of time after completion of executions of a plurality of tasks carried out in cycles based on the respective tasks and prior to the simultaneous starts of the execution cycles of the plurality of tasks.

The receiving unit 23 has a function for receiving a switching instruction of operating modes. More specifically, the receiving unit 23 receives a switching instruction transmitted from the tool device 80 through the communication IF 15 (see FIG. 2). In this case, the switching instruction to be transmitted from the tool device 80 includes a switching instruction from the operation mode to the program mode (user program stopping instruction) and a switching instruction from the program mode to the operation mode (user program starting instruction).

The management unit 24, which is a scheduler, manages executions of a plurality of tasks by the task executing unit 21, and has a function for managing a timing in which the mode switching unit 22 switches the operating modes. More specifically, the management unit 24 is configured such that, when a plurality of tasks executed by the task executing unit 21 are synchronized with one another after the receiving unit 23 receives a switching instruction, the operating modes are switched by the mode switching unit 22.

Additionally, the CPU unit 1 is configured such that, even when multitask processes are executed at the time of the operation mode, an editing process of a user program can be carried out. That is, the CPU unit 1 is configured so as to carry out an on-line editing process.

Figure 5:
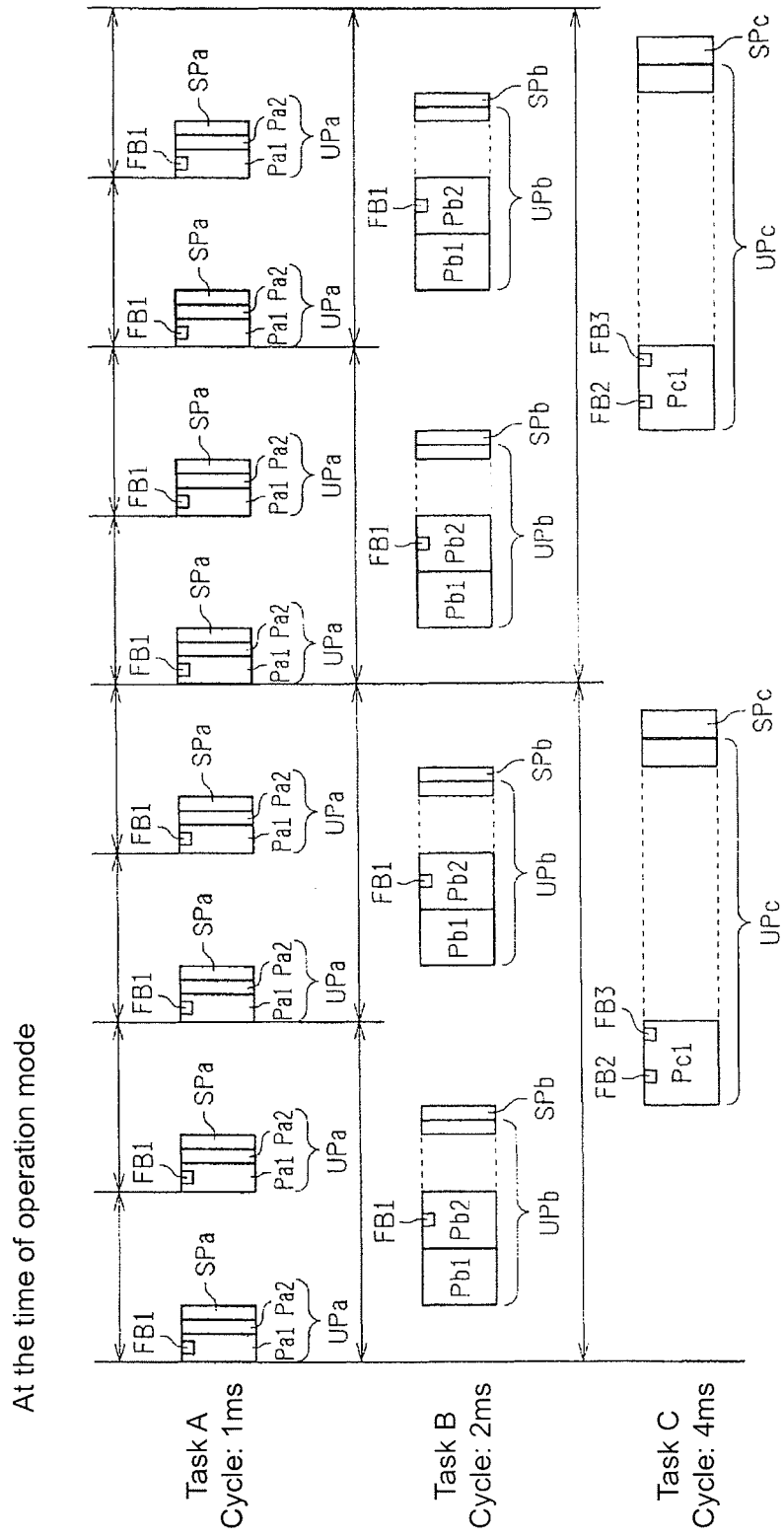
FIG. 5 shows a time chart for explaining operations, at the time of an operation mode, of the CPU unit in accordance with the first embodiment of the present invention.

Next, referring to FIG. 5, the following description will be given of operations, at the time of the operation mode, of the CPU unit 1 in accordance with the first embodiment. In this case, in the operation mode, user programs for the respective tasks are executed. Moreover, the following operations are carried out when the system program 121 is executed by the CPU 11 of the CPU unit 1 (see FIG. 2). That is, the system program 121 is a system program for allowing the CPU unit 1 to execute the following operations.

At the time of the operation mode, upon starting a control cycle, execution cycles of the tasks A, B and C are simultaneously started by the management unit 24 (see FIG. 3). Additionally, the task A is executed in a cycle of 1 ms, the task B is executed in a cycle of 2 ms, and the task C is executed in a cycle of 4 ms.

More specifically, first, the process of the task A having the highest degree of preference is started by the task executing unit 21 (see FIG. 3). At this time, since the tasks B and C are lower in the degree of preference than the task A, actual processes for the tasks B and C are not started and the tasks B and C are kept in stand-by states.

Then, the user program UPa of the task A and the program SPa other than the user program are executed, and upon completion of the process of the task A, a process of the task B having a higher degree of preference than that of the task C is started. At this time, the task C is kept in the stand-by state. Then, the user program UPb of the task B is executed.

Next, after a lapse of 1 ms from the simultaneous starts of the execution cycles of the tasks A, B and C, since the execution cycle of the task A has been elapsed, the user program UPb of the task B is suspended by the management unit 24, and the execution of the task A is started. At this time, the tasks B and C are kept in stand-by states.

Moreover, the user program UPa of the task A and the program SPa other than the user program are executed, and upon completion of the process of the task A, the process of the suspended task B is resumed. Thus, the rest of the user program UPb of the task B and the program SPb other than the user program are executed. Upon completion of the process of the task B, the process of the task C is started so that the user program UPc of the task C is executed.

Next, after a lapse of 2 ms from the simultaneous starts of the execution cycles of the tasks A, B and C, since the execution cycle of the task A has been elapsed, the user program UPc of the task C is suspended by the management unit 24, and the execution of the task A is started. At this time, since the execution cycle of the task B has also been elapsed, the tasks B and C are kept in stand-by states. That is, after a lapse of 2 ms from the simultaneous starts of the execution cycles of the tasks A, B and C, the execution cycles of the tasks A and B are again started simultaneously.

Then, the user program UPa of the task A and the program SPa other than the user program are executed, and upon completion of the task A, the process of the task B is started. At this time, the task C is kept in the stand-by state. Then, the user program UPb of the task B is executed.

Next, after a lapse of 3 ms from the simultaneous starts of the execution cycles of the tasks A, B and C, since the execution cycle of the task A has been elapsed, the user program UPb of the task B is suspended by the management unit 24, and the execution of the task A is started. At this time, the tasks B and C are kept in stand-by states.

Moreover, the user program UPa of the task A and the program SPa other than the user program are executed, and upon completion of the process of the task A, the process of the suspended task B is resumed. Thus, the rest of the user program UPb of the task B and the program SPb other than the user program are executed. Moreover, upon completion of the process of the task B, the process of the suspended task C is resumed. Thus, the rest of the user program UPc of the task C and the program SPc other than the user program are executed. Then, after a lapse of 4 ms from the simultaneous starts of the execution cycles of the tasks A, B and C after the completion of the process of the task C, since the execution cycle of the task A has been elapsed, the execution of the task A by the task executing unit 21 is carried out by the management unit 24. At this time, since the execution cycles of the tasks B and C have also been elapsed, the tasks B and C are kept in stand-by states. That is, after a lapse of 4 ms from the simultaneous starts of the execution cycles of the tasks A, B and C, the execution cycles of the tasks A, B and C are again started simultaneously. Thereafter, the above-mentioned operations are repeatedly carried out.

In this manner, in the operation mode, the user program UPa of the task A, the user program UPb of the task B and the user program UPc of the task C are executed so that the control object apparatus 60 (see FIG. 1) is controlled by the PAC 100 (see FIG. 1).

Figure 6:
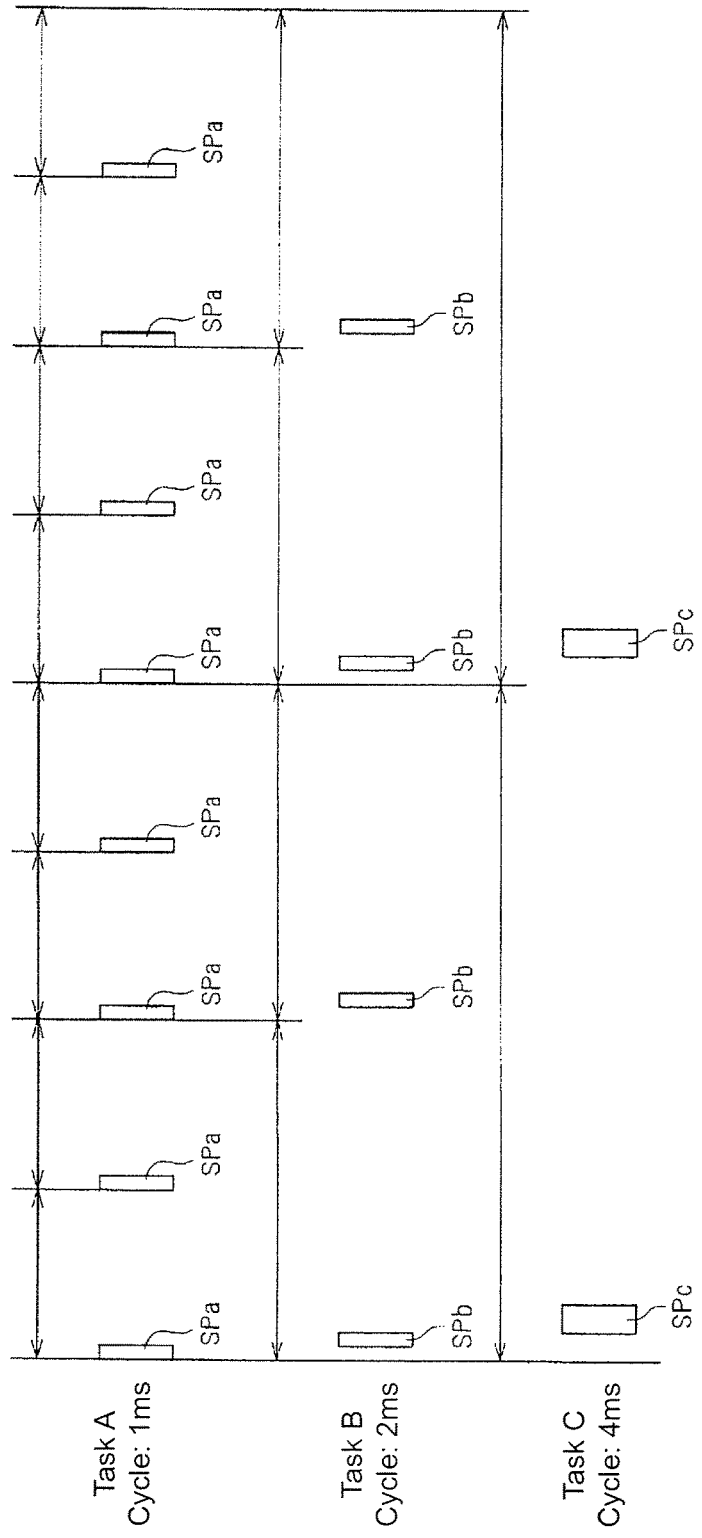
FIG. 6 shows a time chart for explaining operations, at the time of a program mode, of the CPU unit in accordance with the first embodiment of the present invention.

Next, referring to FIG. 6, the following description will be given of operations, at the time of the program mode, of the CPU unit 1 in accordance with the first embodiment. In the program mode, only the programs other than the user programs are executed without executing the user programs of the respective tasks. Moreover, the following operations are carried out when the system program 121 is executed by the CPU 11 of the CPU unit 1 (see FIG. 2). That is, the system program 121 is a system program for allowing the CPU unit 1 to execute the following operations.

In the program mode, upon starting a control cycle, execution cycles of the tasks A, B and C are simultaneously started by the management unit 24 (see FIG. 3). Additionally, the task A is executed in a cycle of 1 ms, the task B is executed in a cycle of 2 ms, and the task C is executed in a cycle of 4 ms.

More specifically, first, the process of the task A having the highest degree of preference is started by the task executing unit 21 (see FIG. 3). At this time, since the tasks B and C are lower in the degree of preference than the task A, actual processes for these are not started and these are kept in stand-by states.

Moreover, the program SPa other than the user program of the task A is executed, and upon completion of the process of the task A, a process of the task B having a higher degree of preference than that of the task C is started. At this time, the task C is kept in the stand-by state.

Then, the program SPb other than the user program of the task B is executed, and upon completion of the process of the task B, a process of the task C is started. Thereafter, the program SPc other than the user program of the task C is executed, and the process of the task C is completed.

Next, after a lapse of 1 ms from the simultaneous starts of the execution cycles of the tasks A, B and C, since the execution cycle of the task A has been elapsed, the execution of the task A by the task executing unit 21 is carried out by the management unit 24. Thus, the program SPa other than the user program of the task A is executed so that the process of the task A is completed.

Next, after a lapse of 2 ms from the simultaneous starts of the execution cycles of the tasks A, B and C, since the execution cycle of the task A has been elapsed, the execution of the task A by the task executing unit 21 is carried out by the management unit 24. Thus, the process of the task A is started. At this time, since the execution cycle of the task B has also been elapsed, the task B is kept in the stand-by state. That is, after a lapse of 2 ms from the simultaneous starts of the execution cycles of the tasks A, B and C, the execution cycles of the tasks A and B are again started simultaneously.

Then, the program SPa other than the user program of the task A is executed, and upon completion of the task A, the process of the task B is started. Moreover, the program SPb other than the user program of the task B is executed, and the process of the task B is completed.

Next, after a lapse of 3 ms from the simultaneous starts of the execution cycles of the tasks A, B and C, since the execution cycle of the task A has been elapsed, the execution of the task A by the task executing unit 21 is carried out by the management unit 24. Thus, the program SPa other than the user program of the task A is executed so that the process of the task A is completed.

Next, after a lapse of 4 ms from the simultaneous starts of the execution cycles of the tasks A, B and C, since the execution cycle of the task A has been elapsed, the execution of the task A by the task executing unit 21 is carried out by the management unit 24. At this time, since the execution cycles of the tasks B and C have also been elapsed, the tasks B and C are kept in stand-by states. That is, after a lapse of 4 ms from the simultaneous starts of the execution cycles of the tasks A, B and C, the execution cycles of the tasks A, B and C are again started simultaneously. Thereafter, the above-mentioned operations are carried out repeatedly.

In this manner, in the program mode, the user can edit the user programs UPa, UPb and UPc by using the tool device 80 (see FIG. 2) without executing the user program UPa of the task A, the user program UPb of the task B and the user program UPc of the task C. Additionally, in the program mode, executions of the user programs in the respective tasks are omitted, however, the respective tasks are executed in the same execution cycles of those of the operation mode.

Figure 7:
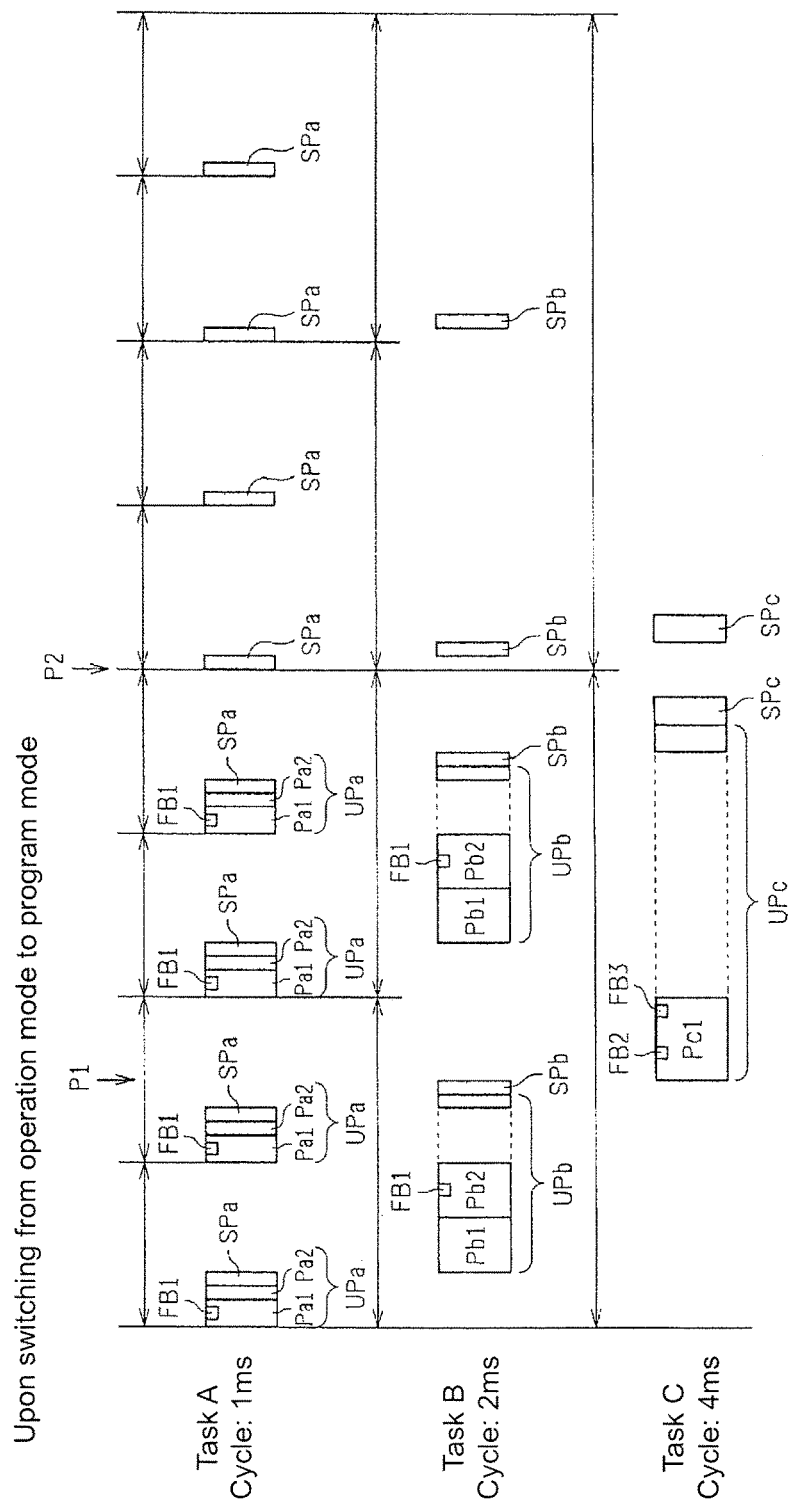
FIG. 7 shows a time chart for explaining operations, upon switching modes from the operation mode to the program mode, of the CPU unit in accordance with the first embodiment of the present invention.

Next, referring to FIG. 7, the following description will be given of operations, at the time of switching modes from the operation mode to the program mode, of the CPU unit 1 in accordance with the first embodiment. Additionally, the switching modes from the operation mode to the program mode means that the control of the control object apparatus 60 (see FIG. 1) by the PAC 100 (see FIG. 1) is stopped by stopping the execution of the user program. Moreover, the following description will be given of operations in the case that a switching instruction (stopping instruction) is transmitted from the tool device 80 (see FIG. 2) during the operation mode, and the receiving unit 23 (see FIG. 3) receives the switching instruction at point of time P1 by receiving the switching instruction by the communication IF 15 (see FIG. 2).

Moreover, the following operations are carried out when the system program 121 is executed by the CPU 11 of the CPU unit 1 (see FIG. 2). That is, the system program 121 is a system program for allowing the CPU unit 1 to execute the following operations.

In the operation mode, upon starting a control cycle, execution cycles of the tasks A, B and C are simultaneously started by the management unit 24 (see FIG. 3). In this case, the processes of the tasks A, B and C are the same as those as described earlier. Moreover, the switching instruction is received by the receiving unit 23 at the point of time P1.

For this reason, when the tasks A, B and C are next synchronized with one another (when the execution cycles of the tasks A, B and C are simultaneously started), the management unit 24 allows the mode switching unit 22 (see FIG. 3) to switch modes from the operation mode to the program mode. That is, at point of time P2, when the execution cycles of the tasks A, B and C are made coincident with one another, the operation mode is switched to the program mode.

Thus, even after the receiving unit 23 receives the switching instruction, up to the time when the execution cycles of the tasks A, B and C are simultaneously started at point of time P2, the user program UPa of the task A, the user program UPb of the task B and the user program UPc of the task C are executed. Therefore, the executions of the user program UPa of the task A, the user program UPb of the task B and the user program UPc of the task C are not interrupted in the middle thereof.

Moreover, when at the point of time P2, the execution cycles of the tasks A, B and C are simultaneously started, the tasks A, B and C are executed in the program mode. Thus, only the program SPa other than the user program is executed in the task A, only the program SPb other than the user program is executed in the task B, and only the program SPc other than the user program is executed in the task C.

Figure 8:
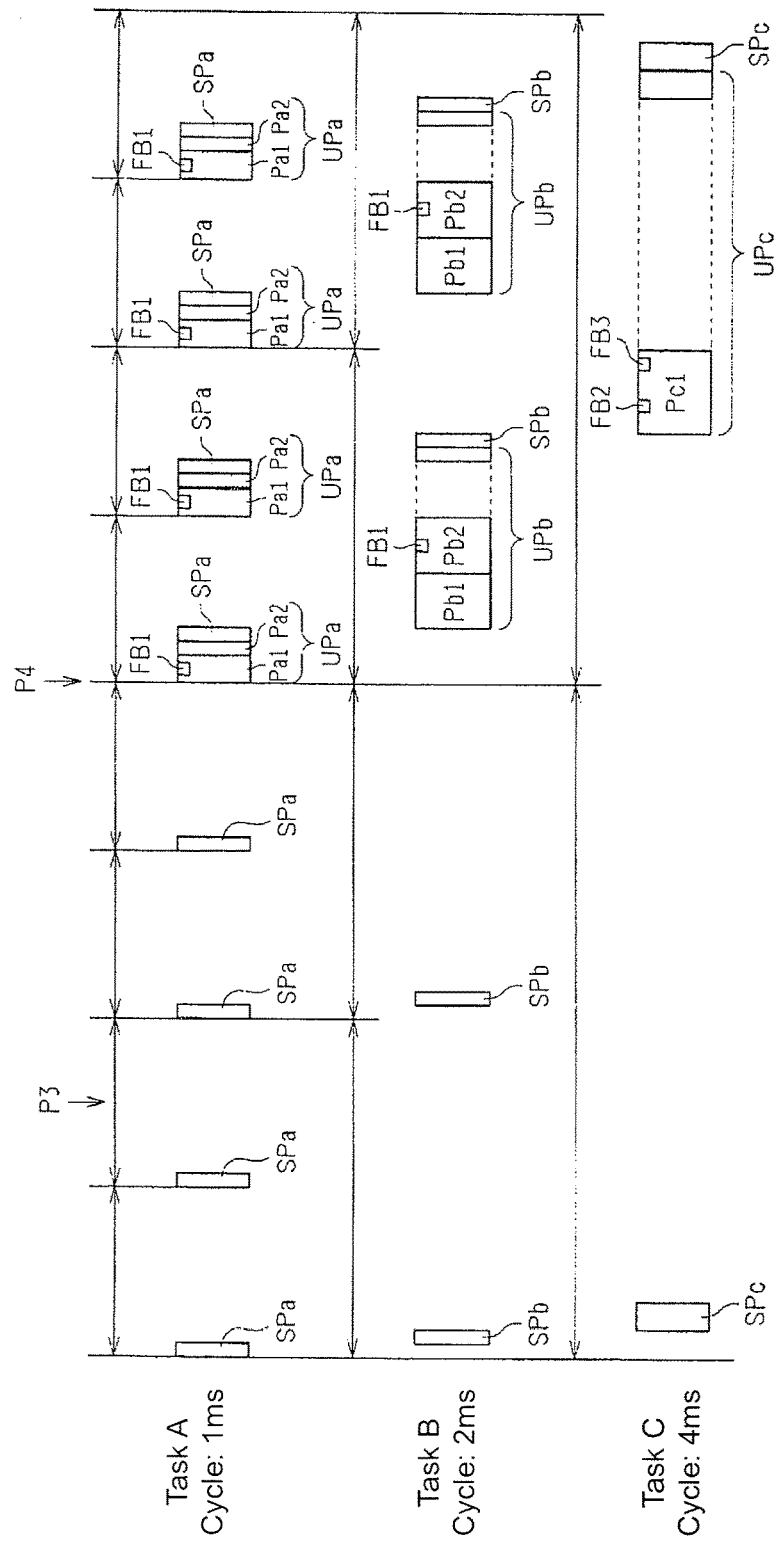
FIG. 8 shows a time chart for explaining operations, upon switching modes from the program mode to the operation mode, of the CPU unit in accordance with the first embodiment of the present invention.

Next, referring to FIG. 8, the following description will be given of operations, at the time of switching modes from the program mode to the operation mode, of the CPU unit 1 in accordance with the first embodiment. Additionally, the switching modes from the program mode to the operation mode means that the control of the control object apparatus 60 (see FIG. 1) by the PAC 100 (see FIG. 1) is started by starting the execution of the user program. Moreover, the following description will be given of operations in the case that a switching instruction (starting instruction) is transmitted from the tool device 80 (see FIG. 2) during the program mode, and the receiving unit 23 (see FIG. 3) receives the switching instruction at point of time P3 by receiving the switching instruction by the communication IF 15 (see FIG. 2).

Moreover, the following operations are carried out when the system program 121 is executed by the CPU 11 of the CPU unit 1 (see FIG. 2). That is, the system program 121 is a system program for allowing the CPU unit 1 to execute the following operations.

In the program mode, upon starting a control cycle, execution cycles of the tasks A, B and C are simultaneously started by the management unit 24 (see FIG. 3). In this case, the processes of the tasks A, B and C are the same as those as described above. Moreover, the switching instruction is received by the receiving unit 23 at the point of time P3.

For this reason, when the tasks A, B and C are next synchronized with one another (when the execution cycles of the tasks A, B and C are simultaneously started), the management unit 24 allows the mode switching unit 22 (see FIG. 3) to switch modes from the program mode to the operation mode. That is, when the execution cycles of the tasks A, B and C are made coincident with one another at point of time P4, the program mode is switched to the operation mode.

Thus, even after the receiving unit 23 receives the switching instruction, up to the time when the execution cycles of the tasks A, B and C are simultaneously started at the point of time P4, none of the user program UPa of the task A, the user program UPb of the task B and the user program UPc of the task C are executed. Therefore, for example, it is possible to prevent the occurrence of such a state in which the user program UPa of the task A and the user program UPb of the task B are executed, with the user program UPc of the task C being not executed.

Moreover, when the execution cycles of the tasks A, B and C are simultaneously started at the point of time P4, the tasks A, B and C are executed in the operation mode. Thus, in the task A, the user program UPa and the program SPa other than the user program are executed, in the task B, the user program UPb and the program SPb other than the user program are executed, and in task C, the user program UPc and the program SPc other than the user program are executed.

In the first embodiment, as described above, in the case that a plurality of tasks to be executed (tasks A, B and C) are synchronized with one another after the receiving unit 23 receives the switching instruction, switching operating modes can prevent the execution of the user program of each task from being suspended in the middle and prevent only the user program of one portion of the task from being executed. Therefore, while multitask processes are being executed, the switching of operating modes can be carried out appropriately. As a result, since correct operation results can be obtained in the user programs of the respective tasks, the PAC 100 is allowed to control the control object apparatus 60 normally.

Moreover, in the first embodiment, the CPU 11 is a single core device, and by executing a plurality of tasks in parallel with one another in a time sharing manner, the processing capability of the CPU 11 can be efficiently utilized.

Furthermore, in the first embodiment, since the cycles of the tasks B and C are set to integral multiples of the cycle of the task A, the tasks A, B and C can be easily synchronized with one another.

<Second Embodiment>

First, referring to FIGS. 9 to 10, the following description will be given of a configuration of a CPU unit 1a in accordance with a second embodiment. Additionally, the same components as those of the CPU unit 1 of the first embodiment are indicated by the same reference numerals, and overlapped descriptions thereof will be omitted.

Figures 9, 10:
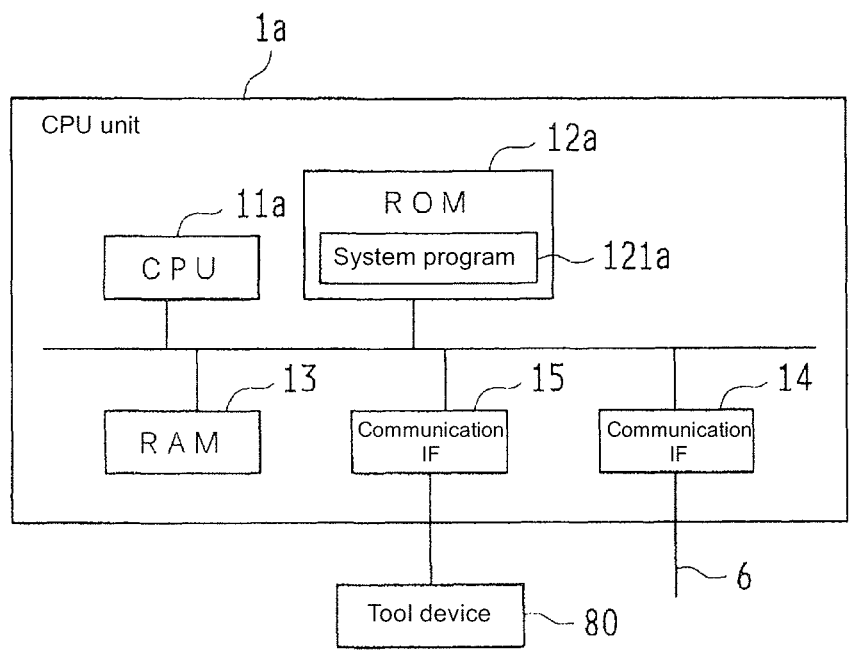
FIG. 9 is a hardware block diagram showing configurations of a CPU unit in accordance with a second embodiment of the present invention.
FIG. 10 is a view for explaining information relating to tasks stored in a ROM of the CPU unit shown in FIG. 9.

As shown in FIG. 9, the CPU unit 1a in which a system program 121a is installed is configured such that operations of the CPU unit 1a are controlled by executing the system program 121a. In this case, the CPU unit 1a is one example of "the control device" of the present invention.

The CPU unit 1a includes a CPU 11a, a ROM 12a, a RAM 13, and communication IF 14 and 15. Additionally, the ROM 12a is one example of "the storing unit" of the present invention.

The CPU 11a has a function for executing the system program 121a. The CPU 11a is a dual core device and configured to execute a plurality of tasks in parallel with one another simultaneously. That is, the CPU 11a executes multitask processes. The other configurations of the CPU 11a are the same as those of the aforementioned CPU 11.

In the ROM 12a, the system program 121a is stored, and information L2 (see FIG. 10) relating to tasks to be executed in the CPU unit 1a is also stored. The information L2 relating to tasks includes names of the respective tasks, degrees of preference of the respective tasks, cycles in which the respective tasks are executed, configurations of the user programs to be executed in the respective tasks and a program organization unit for forming the user program for each of the tasks. Additionally, the other configurations of the ROM 12a are the same as those of the aforementioned ROM 12.

In the example of FIG. 10, a task D is more preferentially executed than a task E, and is executed in a cycle of 1 ms. That is, the task D uses a control cycle of one time (time interval of 1 ms) as its execution cycle. Moreover, the task D includes a user program UPd configured by programs Pd1 and Pd2. Moreover, the task D includes a function block FB4 to be utilized in the program Pd1. Additionally, the task D is one example of "the reference task" of the present invention.

Moreover, a task E is executed more subordinately than the task D, and is executed in a cycle of 2 ms. That is, the task E uses a control cycle of two times (time interval of 2 ms) as its execution cycle. Moreover, the cycle of the task E is set to an integral multiple (two times) of the cycle of the task D. Furthermore, the task E includes a user program UPe configured by programs Pe1 and Pe2. The task E includes a function block FB4 to be utilized in the program Pe2. Additionally, the task E is one example of "a task other than the reference task" of the present invention.

Next, referring to FIG. 11, the following description will be given of operations at the time of the operation mode in the CPU unit 1a in accordance with the second embodiment. In this case, in the operation mode, a user program of each task and a program other than the user program are executed. Moreover, the following operations are carried out when the system program 121a is executed by the CPU 11a of the CPU unit 1a (see FIG. 9). That is, the system program 121a is a system program for allowing the CPU unit 1a to execute the following operations.

At the time of the operation mode, upon starting a control cycle, execution cycles of the tasks D and E are simultaneously started by the management unit 24 (see FIG. 3). Additionally, the task D is executed in a cycle of 1 ms, and the task E is executed in a cycle of 2 ms.

In the CPU unit 1a of the second embodiment, the task D and the task E are processed in parallel with each other. Moreover, after a lapse of 1 ms from the simultaneous starts of the execution cycles of the tasks D and E after the completion of the task D, since the execution cycle of the task D has been elapsed, the management unit 24 allows the task executing unit 21 to execute the task D. Thereafter, after a lapse of 2 ms from the simultaneous starts of the execution cycles of the tasks D and E after the completion of the process of the tasks D and E, since the execution cycles of the tasks D and E have been elapsed, the executions of the tasks D and E by the task executing unit 21 are again carried out by the management unit 24. Thereafter, the above-mentioned operations are repeatedly carried out.

Additionally, operations at the time of the program mode of the CPU unit 1a of the second embodiment, operations at the time of switching modes from the operation mode to the program mode thereof, and operations at the time of switching modes from the program mode to the operation mode thereof are the same as those of the CPU unit 1 of the first embodiment except that the tasks D and E are simultaneously executed in parallel with each other.

As described above, in the second embodiment, since the CPU 11a is a dual core device, and executes a plurality of tasks simultaneously in parallel with one another so that it is possible to improve the task processing capability.

In this case, the other effects of the second embodiment are the same as those of the first embodiment.

Additionally, the present embodiments disclosed above are exemplary only in all the aspects, and do not form the basis of a limited interpretation. Therefore, the technical scope of the present invention is not interpreted only by the above-mentioned embodiments, but defined based upon the description of the claims. Moreover, the technical scope of the present invention includes all modifications made within the meaning and scope equal to the claims.

For example, the first embodiment has exemplified a configuration in which the PAC 100 is provided with the CPU unit 1, the input unit 2, the output unit 3, communication unit 4 and the power supply unit 5; however, not limited to this configuration, the PAC may have another unit, and none of the input unit and the communication unit may be installed in the PAC.

Moreover, the first embodiment has exemplified a configuration in which the PAC 100 is constituted by a plurality of units; however, not limited by this configuration, the PAC may be formed by one casing, with functions of the respective units being incorporated in the casing.

Furthermore, the first embodiment has exemplified a configuration in which a switching instruction transmitted from the tool device 80 is received by the receiving unit 23; however, not limited by this configuration, a switching instruction transmitted by another PAC 70 via a communication unit 4 may be received by the receiving unit 23. Moreover, a switching instruction generated by a user program executed by the CPU unit 1 may be received by the receiving unit 23.

The first embodiment has exemplified a configuration in which, when the CPU 11 executes the system program 121, the task executing unit 21, the mode switching unit 22, the receiving unit 23 and management unit 24 are realized; however, not limited to this configuration, the task executing unit 21, the mode switching unit 22, the receiving unit 23 and the management unit 24 may be respectively configured by hardware units.

Furthermore, with respect to tasks in the first and second embodiments, in addition to tasks that are regularly executed (fixed-cycle tasks), a task (event task) that is executed when a preliminary set execution condition is satisfied may be included.

Moreover, the second embodiment has exemplified a configuration in which the CPU 11a is a dual core device; however, not limited to this configuration, for example, the CPU may be a quad core device. That is, the number of cores of the CPU may be any number.

DESCRIPTION OF SYMBOLS 1, 1a CPU unit (control device)
12, 12a ROM (storing unit)
15 communication IF (communication unit)
21 task executing unit (task execution means)
22 mode switching unit (mode switching means)
23 receiving unit (receiving means)
24 management unit (management means)
60 control object apparatus
80 tool device
121, 121a system program

The invention claimed is:
1. A control device for controlling a control object apparatus comprising:
a memory that stores instructions; and
a processor that, when executing the instructions stored in the memory, performs operations comprising:
executing a plurality of tasks having different cycle times concurrently, each task including a user program,
switching operation modes between a first mode and a second mode, wherein the user program is executed in the first mode, and execution of the user program is stopped in the second mode to allow editing of the user program,
receiving a switching instruction to switch the operation modes between the first mode and the second mode,
postponing the switching of the operation modes between the first mode and the second mode until the plurality of tasks are synchronized with each other, such that the switching of the operation modes between the first mode and the second mode does not occur upon receipt of the switching instruction,
wherein the plurality of tasks are synchronized with each other at a time after completion of the execution of the plurality of tasks in each of the cycles provided for the plurality of tasks, when the cycles of the plurality of tasks start simultaneously, and normally controlling the control object apparatus, when the switching of the modes is carried out during an execution of the user program, based on the plurality of tasks being synchronized with each other.

2. The control device according to claim 1, further comprising:

a storage configured to store the user program; and a communication interface configured to communicate with a tool device for editing the user program stored in the storage, wherein the processor receives the switching instruction transmitted from the tool device via the communication interface.

3. The control device according to claim 1, wherein the plurality of tasks comprise a reference task and tasks other than the reference task, and each of the tasks other than the reference task has a cycle having an integral multiple of a cycle of the reference task.

4. A non-transitory computer readable recording medium storing a system program, which is executed by a control device comprising a first mode for controlling a control object apparatus by executing a user program in each task and a second mode in which no user program is executed in each task, the system program causing a processor of the control device to execute operations of:

executing a plurality of tasks having different cycle times concurrently, each task including the user program, switching operation modes between a first mode and a second mode, wherein the user program is executed in the first mode, and execution of the user program is stopped in the second mode to allow editing of the user program, receiving a switching instruction to switch operation modes between the first mode and the second mode, postponing the switching of the operation modes between the first mode and the second mode until the plurality of tasks are synchronized with each other, such that the switching of the operation modes between the first mode and the second mode does not occur upon receipt of the switching instruction, wherein the plurality of tasks are synchronized with each other at a time after completion of the execution of the plurality of tasks in each of the cycles provided for the plurality of tasks, when the cycles of the plurality of tasks start simultaneously, and normally controlling the control object apparatus, when the switching of the modes is carried out during an execution of the user program, based on the plurality of tasks being synchronized with each other.

* * * * *